UNITED STATES PATENT OFFICE.

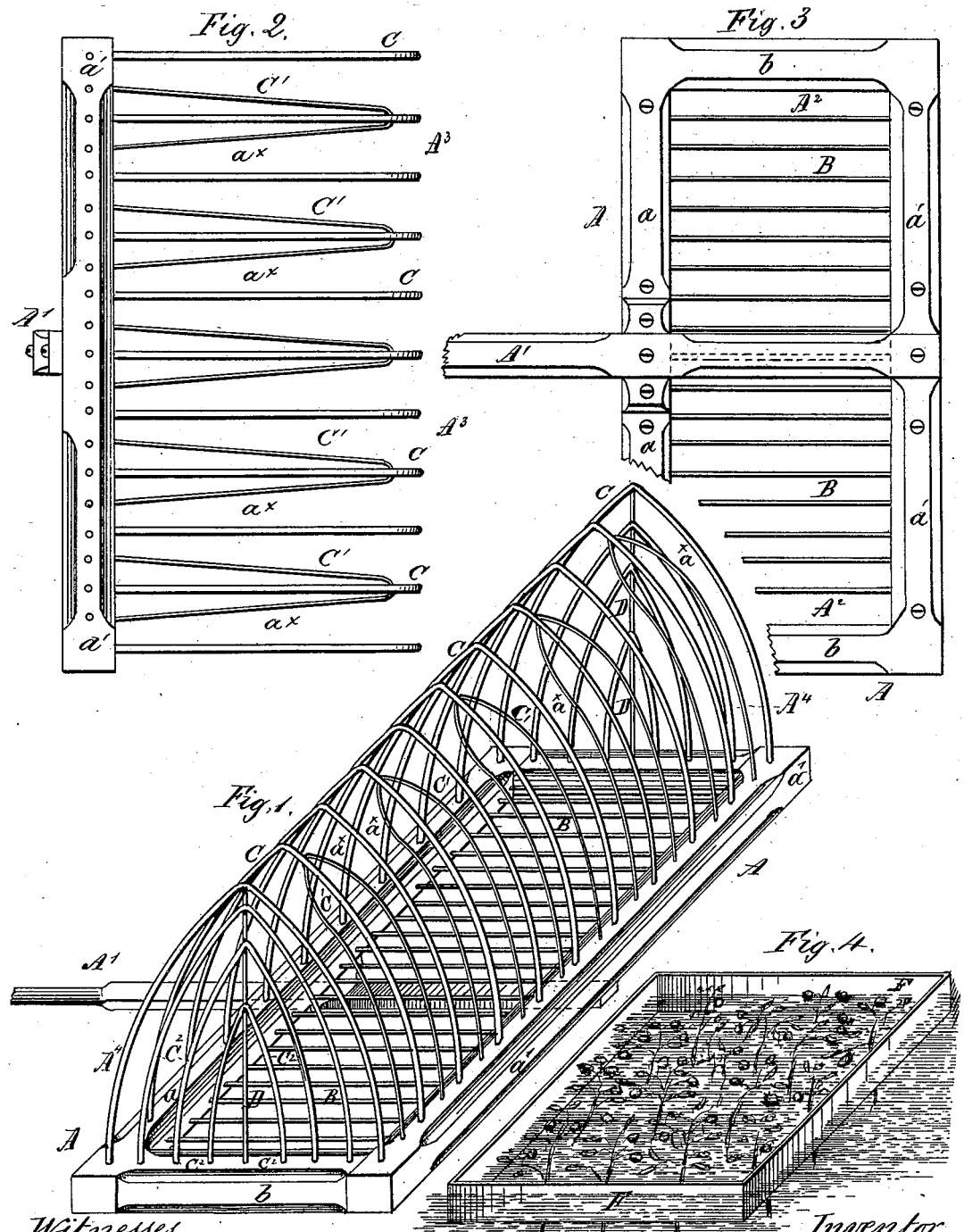

ANDREW C. NICKERSON, OF BARNSTABLE, ASSIGNOR OF ONE-THIRD HIS RIGHT TO JONATHAN W. ELLIS, OF NEW BEDFORD, MASSACHUSETTS.

IMPROVEMENT IN CRANBERRY-PICKERS.

Specification forming part of Letters Patent No. 201,280, dated March 12, 1878; application filed January 4, 1878.

*To all whom it may concern:*

Be it known that I, ANDREW C. NICKERSON, of Barnstable, county of Barnstable, and State of Massachusetts, have invented certain new and useful Improvements in a Method and Apparatus for Picking Cranberries, of which the following is a specification:

My invention relates to a novel method and means for picking cranberries.

It consists, first, in inclosing a given area of vines by means of a floating frame, the sides of which are in a vertical position when surrounding the vines, then picking the berries, throwing them back into the water to free them of unsound berries and cleanse them of impurities, and, finally, gathering the berries in a cleansed state, and placing them in a suitable receptacle; secondly, in a novel apparatus for picking the berries, consisting of a prismatic wire cage, the space between the wires on one of its sides or parallelograms being greater than that between the wires of all the other sides, as fully described hereinafter.

In the accompanying drawings, Figure 1 is a perspective view, Fig. 2 an under-side view, and Fig. 3 a rear elevation, of my improved apparatus. Fig. 4 is a diagram of the frame employed in my new method of picking cranberries in wet bogs.

The cranberry-rake consists of an oblong frame, A, made of any suitable light material, and is composed of the two longer arms $a\,a'$ and the cross-pieces $b\,b$. $A^1$ is a handle, secured to the arms $a\,a'$ in the center of the frame and at an angle thereto, so that when the apparatus is held in the hand the apex of the prismatic cage will be turned upward to facilitate the picking or combing of the vines. B B are a series of wires attached to the arms $a\,a'$, which wires, together with the handle $A^1$, form the back $A^2$ of the apparatus. The space between the wires B should be less than the diameter of a cranberry, to prevent their falling through after having been combed or raked off the vines. C C are wires extending forward of the frame A, their ends being connected with the arms $a\,a'$. These wires are bent or curved to form triangles, or nearly so, the space between them being about twice as great as that between wires B. $C^1\,C^1$ are intermediate wires, having their ends made fast to arm $a'$ of the frame A. These wires are also bent or curved into nearly triangular shape, their apexes being connected with wires C a little below the line of the apexes of the latter wires, which may be done by wiring or soldering; but as these methods would necessarily leave rough surfaces or projecting edges, liable to mutilate the vines, which should be especially guarded against, I prefer to pass the wires $C^1$ through wires C, as shown, employing for $C^1$ a wire of less diameter, as will be readily understood.

By this arrangement of intermediate wires the lower side $A^3$ of the apparatus is provided with a series of wedge-shaped openings or slots, $a^x$, tapering from below the line of the apexes of the wires C to the frame A, being narrowest at that point. By these means the branches and berries may be drawn through the cage and the berries combed therefrom and retained within said cage, a tilting motion being imparted thereto each time a vine or branch is combed or passed through it.

$A^4\,A^4$ are the ends of the cage, formed of a series of triangular bent wires, $C^2$, and the end wires C. The ends of the wires $C^2$ are made fast to the cross-pieces $b\,b$, and held firmly in position by means of a vertical wire, D, passing through the curved or bent wires $C^2$ and the curved or triangular end wires C of the series.

It is well known that whenever practicable the cranberry-bogs are flooded for picking, as it facilitates the operation and lessens the liability of injuring the vines. The wet picking being a tedious and disagreeable work when effected by hand, I have, therefore, devised a method for inclosing a certain area of vines by means of a floating frame of thin boards, which frame may be of any convenient shape and size, the operation being as follows:

The frame F (shown in Fig. 4) is pushed over the vines, and the berries stripped therefrom by means of the rake or apparatus above described, and as fast as picked are dumped or thrown in the water again, and prevented from floating off by the said frame. When all the vines within the inclosure are picked, the berries floating on the surface are gathered again and placed in bags.

The advantage of this method is that only the good or sound berries are gathered, as all the rotten or unsound berries will sink, and, furthermore, they are thoroughly cleansed and freed from all leaves or other impurities, thus avoiding the sorting or picking over of the berries.

By means of the improved rake above described, in conjunction with the floating frame, the work is done in a very rapid and thorough manner, the construction of the rake being especially designed to avoid injury to the vines, and also to effect a great saving in labor.

It will be understood that I do not confine myself to the particular use of the rake as above described, as it is evident that by reducing the space between the wires correspondingly the apparatus may be employed for picking other than cranberries—such as huckle or whortle berries.

Having thus described my invention, I claim and desire to secure by Letters Patent—

1. An apparatus for picking cranberries, consisting of a prismatic wire cage, provided with a suitable handle, the space between the wires on one side or parallelogram being greater than that between the wires of all the other sides, substantially as described, for the purpose specified.

2. An apparatus for picking cranberries, consisting of a prismatic wire cage, provided with a suitable handle, the wires on one of its sides or parallelograms being so arranged as to form wedge-shaped or tapering slots, substantially as described, for the purpose specified.

3. The combination of the frame A, wires B C $C^1$ $C^2$ D, and the handle $A^1$, all arranged and combined substantially as described, for the purpose set forth.

4. The combination, with the arm $a'$, the frame A, and the wires C, of the wires $C^1$, substantially as described, and constructed as specified.

5. The wires C and $C^2$, bent to shape, as described, and provided with suitable apertures or holes, in combination with the vertical wires D and the curved or triangular wires $C^1$, passing through said wires C $C^2$, and the frame A, all constructed substantially as described, for the purpose specified.

In witness that I claim the foregoing I have hereunto set my hand this 28th day of December, 1877.

ANDREW C. NICKERSON.

Witnesses:
 E. L. STERNER,
 H. M. KNOWLTON.